United States Patent Office 3,071,438
Patented Jan. 1, 1963

3,071,438
METHOD OF PREPARING NITRAMIDE AND N-ALKYL SUBSTITUTED NITRAMIDES
H. C. Mandell, Jr., Abington, Pa., assignor to Pennsalt Chemicals Corporation, Philadelphia, Pa., a corporation of Pennsylvania
No Drawing. Filed Apr. 5, 1960, Ser. No. 19,998
19 Claims. (Cl. 23—190)

This invention relates to a novel process for the preparation of nitramide ($NO_2NH_2$) and its N-alkyl derivatives. More particularly, this invention deals with the process of reacting nitryl fluoride with ammonia or a primary or secondary amine.

Nitramide, the amide of nitric acid, is a moderately stable compound which is useful as a high energy compound (e.g., as a monopropellant for rockets) and as an intermediate in chemical synthesis. Unfortunately, the known preparations of this compound give poor yields, are complex, tedious and not conducive to commercial use. For example, Inorganic Synthesis, vol. I, p. 72, describes a complex process for making nitramide which involves the preparation and subsequent hydrolysis of nitrourethane salts.

It has now been found that nitramide and N-substituted nitramides are readily prepared in high yields by the process of this invention which comprises contacting nitryl fluoride with an ammonia compound selected from the group consisting of ammonia, primary alkyl amines and secondary alkyl amines.

It is quite surprising that nitramides are obtained by this process since the reaction of nitryl chloride with ammonia or amines gives entirely different type products. For example, nitryl chloride and ammonia yields ammonium nitrite and chloramine (Angew. Chem. 67, 493 (1955)), and reaction of nitryl chloride with methylamines yields unstable oils or methylamine nitrites (Dissertation Abstracts 18, 1972 (1958)).

In one embodiment of this process the nitryl fluoride and ammonia compound are contacted in a liquid phase system. This is readily accomplished in several ways, such as contacting solutions of each of the reactants or, by the preferred manner of passing vapors of the ammonia compound or vapors of the nitryl fluoride into an inert solvent solution of the other reactant. The reaction is quite exothermic and proceeds rapidly. The product nitramide compound precipitates from the reaction liquid and is readily obtained by filtering off the solid. A fluoride of the ammonia compound used will also be formed during the process and will also be precipitated from the reaction solution. For many high energy applications of the product, this fluoride need not be separated from the nitramide, but, if desired, it may be removed by fractional crystallization. Alternately, the nitramide may be separated from its admixture with the fluoride by solvent extraction with liquid ammonia or a liquid amine in which the nitramide will have considerable solubility, the nitramide being recovered by simply evaporating the volatile amine solvent.

The inert reaction solvents, of course, will be inert to both reactants and product. Such solvents are commonly known and include aliphatic hydrocarbons such as hexane, heptane, octane, cyclohexane, and the like; ethers such as diethylether, methylethylether, isopropylether, dioxane, etc., amides such as dimethylformamide, dimethylacetamide, etc., and miscellaneous other inert solvents such as carbon tetrachloride, dimethylsulfoxide, dimethylsulfone, and the like. The purpose of the inert solvent is merely to disperse the reactants, permitting them to be brought together in diluted form, and also to carry away quickly the very appreciable heat of reaction released, which otherwise would raise the temperature of the product and bring about its decomposition. The qualifications of the solvent, then, are just that it be inert to reactants and products and dissolve at least a small concentration of reactants.

In another embodiment of this process the reaction will be made to occur in the vapor phase. In this instance a diluent gas will preferably be used to prevent an excessive temperature rise with subsequent decomposition of reagents and product. Any of the usual gases inert to the reactants and products may be used as diluents, including such gases as nitrogen, argon, helium, oxygen and the like. The gases are introduced into a reaction chamber where the product nitramide is formed and falls to the bottom of the chamber from which it is mechanically removed. Again, the fluoride of the ammonia compound is formed and may be separated, if desired, by the methods given above. In lieu of using a diluent gas ot reduce reactant concentration, the vapor phase process may be carried out under vacuum.

The reaction proceeds to give essentially stoichiometric yields. Accordingly, the amounts of reagents used will be based upon the stoichiometry of the particular ammonia compounds reacted with the nitryl fluoride.

It will be understood that removal of the heat of reaction may be assisted by using low temperatures both in the liquid phase and vapor phase processes. In general, temperatures below about 50° C. will be employed to avoid decomposition of the product, and preferably temperatrues between about −10° C. and 30° C. will be employed, but lower temperatures (e.g., liquid ammonia temperature of −33° C.) may readily be employed.

The nitryl fluoride reagent is readily available in 100% yields by reaction of fluorine with nitrogen dioxide in accordance with the procedure disclosed by Faloon and McKenna in J.A.C.S. 73, 2937 (1951). Other methods of making nitryl fluoride may also be used such as reaction of elemental fluorine and dry sodium nitrite as reported by Aynsley et al., J. Chem. Soc. 1954, 1119.

The ammonia compounds which may be used are, as indicated, those taken from the group of ammonia, primary alkyl amines and secondary alkyl amines. The primary and secondary amines may be any of the straight chain alkyl or cycloalkyl amines. Preferably, alkyl amines containing from one to eighteen carbon atoms will be used and these amines are represented by methylamine, methylethylamine, di-amylamine, diethylamine, n-hexylamine, n-octylamine, dodecylamine, hexadecylamine, octadecylamine, and the like. Diamines may also be employed and these of course will react at both amino functions to give dinitramide compounds having particular value as high energy chemicals. Examples of diamines which may be so used include hydrazine, alkylenediamines such as ethylenediamine, 1,3-diaminopropane, etc.

In order to illustrate this novel process further, the following examples are given:

Example 1

A saturated solution of ammonia in diethylether is prepared by bubbling ammonia gas for twenty minutes through 300 ml. of the solvent. Then a gas stream of nitryl fluoride is bubbled through the ammonia solution. It is observed that in 18 minutes the temperature rises from the starting 26° C. to 32° C. and the flow of nitryl fluoride is stopped. The white precipitate that forms consisitng of both very fine and clumpy solid is filtered off and is washed with diethylether. The product is a mixture (M.P. 72° C.) consisting of nitramide and ammonium fluoride.

This solid mixture is repeatedly extracted with liquid $NH_3$ at −33° C. The combined extracts are evaporated to dryness, leaving a residue of pure $NO_2NH_2$ melting with decomposition at 72° C. The original solid after extraction contains all the $NH_4F$ and some $NO_2NH_2$.

*Example 2*

Example 1 is repeated using carbon tetrachloride. Although the production of nitramide is less due to the lower solubility of ammonia in the solvent, essentially the same results are obtained.

*Example 3*

A saturated solution of $NO_2F$ in $CCl_4$ is prepared by bubbling excess $NO_2F$ through $CCl_4$ for about 15 minutes. Then a stream of $NH_3$ gas is passed through the solution. Solid $NO_2NH_2$ and $NH_4F$ are formed, precipitated and separated as described in Example 1.

*Example 4*

A solution of di-isopropylamine (10 ml.) in diethylether (100 ml.) is treated with gaseous nitryl fluoride as in Example 1. The white precipitate is filtered off, washed with ether and vacuum dried. The product di-isopropyl nitramide (plus di-isopropyl ammonium fluoride) melts at 95° C.

*Example 5*

In a suitable flask, 300 ml. of n-heptane are saturated with methyl amine gas by passing gas through the solvent for 10 minutes. Then a gas stream of $NO_2F$ is bubbled through the solution, leading to the precipitation of methyl nitramide and methyl ammonium fluoride. Repeated extraction of the solids with liquid $CH_3NH_2$ at $-10°$ C. leaves a residue consisting of all the fluoride plus some amide. The extract contains pure $CH_3NHNO_2$.

*Example 6*

Streams of gaseous $NO_2F$ and of gaseous $CH_3NH_2$ are fed simultaneously into a large glass chamber where they react rapidly to precipitate a mixture of $CH_3NHNO_2$ and $CH_3NH_3F$. These solids fall out onto the walls and floor of the chamber from which they are removed mechanically.

*Example 7*

Gas streams of dimethylamine and of $NO_2F$ are fed simultaneously into 300 ml. of diethyl ether. The gases dissolve and react rapidly, precipitating $(CH_3)_2NHNO_2$ and $(CH_3)_2NH_2F$. The solids are separated using liquid dimethylamine by the procedure described in Example 5.

*Example 8*

Dimethylformamide is saturated with $NO_2F$ by passing the gas through the liquid. A saturated solution of ethylenediamine in dimethylformamide is prepared separately by adding liquid ethylenediamine to the solvent with agitation. The solution of amine is slowly poured into the solution of $NO_2F$ while stirring. The solids recovered consist of $O_2NNHC_2H_5NHNO_2$ plus the difluoride salt.

*Example 9*

Into liquid $NH_3$ at $-35°$ C. is passed a gas stream of $NO_2F$ diluted with $N_2$. $NO_2NH_2$ and $NH_4F$ are precipitated in the liquid $NH_3$ and these are separated as described in Example 1.

It will be understood that many variations may be made in this invention which are within the skill of the art worker and the invention is not to be limited by the above examples.

I claim:

1. A process for the preparation of nitramide and N-alkyl substituted nitramides which comprises contacting at a temperature below 50° C. nitryl fluoride with an ammonia compound selected from the group consisting of ammonia, primary alkylamines and secondary alkylamines, said primary and secondary alkyl amines containing from 1 to 18 carbon atoms.

2. The process of claim 1 carried out in an inert solvent.

3. The process of claim 1 carried out in a lower alkyl ether.

4. The process of claim 3 where the ether is diethyl ether.

5. The process of claim 1 carried out in an aliphatic hydrocarbon solvent containing 6 to 8 carbon atoms.

6. The process of claim 1 carried out in the vapor phase.

7. The process of reacting nitryl fluoride and ammonia to produce nitramide which comprises contacting nitryl fluoride and ammonia at a temperature below 50° C.

8. The process of claim 1 wherein the ammonia compound is primary amine.

9. The process of claim 8 wherein the amine is methyl amine.

10. The process of claim 8 wherein the amine is a diamine.

11. The process of claim 10 in which the diamine is ethylene diamine.

12. The process of claim 1 wherein the ammonia compound is a secondary amine.

13. The process of claim 12 wherein the secondary amine is diisopropyl amine.

14. The process of claim 12 wherein the secondary amine is dimethylamine.

15. The process of making nitramide in accord with claim 1 by passing gaseous nitryl fluoride into a solution of ammonia in a lower aliphatic ether.

16. The process of making N-methyl nitramide in accord with claim 1 by passing gaseous nitryl fluoride into a solution of methylamine in n-heptane.

17. The process of preparing nitramide in accord with claim 1 which comprises contacting ammonia and nitryl fluoride in the vapor phase.

18. The process of preparing N-methyl nitramide in accord with claim 1 which comprises contacting nitryl fluoride and methyl amine in the vapor phase.

19. The process of preparing nitramide in accord with claim 1 which comprises contacting liquid ammonia with gaseous nitryl fluoride.

References Cited in the file of this patent

UNITED STATES PATENTS 2,856,429    Sauer  ------------------ Oct. 14, 1958